(12) United States Patent
Shilon et al.

(10) Patent No.: US 8,352,777 B2
(45) Date of Patent: Jan. 8, 2013

(54) REPLAYING CAPTURED NETWORK TRAFFIC

(75) Inventors: Hanan Shilon, Yehud (IL); Michael Gopshtein, Yahud (IL); Nir Shilon, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 306 days.

(21) Appl. No.: 12/897,224

(22) Filed: Oct. 4, 2010

(65) Prior Publication Data

US 2012/0084605 A1    Apr. 5, 2012

(51) Int. Cl.
  *G06F 11/00* (2006.01)
(52) U.S. Cl. .......... 714/4.1; 370/235
(58) Field of Classification Search .......... 714/33, 714/4.1, 4.11, 25, 47.1, 48; 370/230, 230.1, 370/235, 252; 709/223, 224; 718/105
See application file for complete search history.

(56) References Cited

U.S. PATENT DOCUMENTS

| | | | |
|---|---|---|---|
| 7,096,264 B2 | 8/2006 | Bonney et al. | |
| 7,213,113 B2 | 5/2007 | Sahin et al. | |
| 7,502,860 B1 * | 3/2009 | Champagne | 709/227 |
| 7,653,006 B1 | 1/2010 | Marino et al. | |
| 7,742,415 B1 * | 6/2010 | Dave | 370/231 |
| 2007/0276938 A1 * | 11/2007 | Ottamalika et al. | 709/224 |
| 2009/0063968 A1 * | 3/2009 | Wenig et al. | 715/704 |
| 2009/0116397 A1 | 5/2009 | Denby et al. | |
| 2009/0219829 A1 * | 9/2009 | Merkey et al. | 370/252 |
| 2012/0084437 A1 * | 4/2012 | Wenig et al. | 709/224 |

FOREIGN PATENT DOCUMENTS

JP    5067164    3/1993

OTHER PUBLICATIONS

"Don't Use Dumb Packet-Replay to Test Modern Firewalls", http://labs.mudynamics.com/2010/05/13/dont-use-dumb-packet-replay-to-test-modern-firewalls/, retrieved Jul. 6, 2010, 6 pgs.
"Tomahawk", http://tomahawk.sourceforge.net/MAN.html, Publication Date: Apr. 28, 2006, 5 pgs.
"Tomahawk: Tomahawk Tutorial", http://www.tomahawktesttool.org/tutorial.html, retrieved Jul. 12, 2010, 4 pgs.
Hong, Seung-Sun et al., "On Interactive Internet Traffic Replay", Lecture Notes in Computer Science, vol. 3858/2006, Published 2006, 27 pgs.
Haddad, Ibrahim F. and Gordon, David., "Network Simulator 2: A Simulation Tool for Linux", Publication Date: Oct. 21, 2002, http://www.linuxjournal.com/article/5929, 4 pgs.
"Spirent Communications Avalanche", http://nsslabs.com/test-equipment/spirent-communications-avalanche.html, 5 pgs, Oct. 4, 2010.

(Continued)

*Primary Examiner* — Dieu-Minh Le

(57) ABSTRACT

Systems, methods, and machine readable and executable instructions are provided for replaying captured network traffic. A method for replaying captured network traffic can include replaying multiple captured network traffic files simultaneously on the same network device, the captured network traffic files including original network traffic captured from N original connections between C original clients and S original servers. During replaying, rewriting IP addresses and/or port number information of data packets comprising the original network traffic to reflect test network traffic from M test connections between X test clients and Y test servers, where at least X is different than C or Y is different than S. The method further includes modifying checksums, during replaying, to correct values corresponding to the rewritten IP addresses and port number information. N, C, S, M, X, and Y are positive integers.

15 Claims, 4 Drawing Sheets

OTHER PUBLICATIONS

Insider's guide to HP real-user monitoring, Proactively manage the customer's quality of experience and accelerate time to resolution, Nov. 2008, 8 pages, Available at www.hp.com/go/btosoftware.

HP Business Process Insight for the Windows Operating System Software Version: 7.50, Concepts Guide, Jun. 2008, Available at http://h20230.www2.hp.com/selfsolve/manuals.

* cited by examiner

REPLAYING CAPTURED NETWORK TRAFFIC

BACKGROUND

Business processes may be important to the functioning of an organization. Activities associated with business processes are of interest and may affect the bottom line of a business entity (e.g., an organization). As such, the business entity can have an interest in obtaining and managing metrics associated with a business process. A business process may operationally span multiple applications and may organizationally flow across multiple subdivisions of an organization. A business process can be implemented using diverse hardware and software, involving networked communications across a large geographic area, to execute applications associated with the business process. Network traffic can be monitored as a means for assessing a business process, to evaluate security-related issues, and to measure the operations of the network itself.

DETAILED DESCRIPTION

Embodiments of the present disclosure may include methods, systems, and machine readable and executable instructions and/or logic. An example method for replaying captured network traffic can include replaying multiple captured network traffic files simultaneously on the same network device, the captured network traffic files including original network traffic captured from N original connections between C original clients and S original servers. During replaying, rewriting IP addresses and/or port number information of data packets comprising the original network traffic to reflect test network traffic from M test connections between X test clients and Y test servers, where at least X is different than C or Y is different than S. The method further includes modifying checksums, during replaying, to correct values corresponding to the rewritten IP addresses and port number information. N, C, S, M, X, and Y are positive integers.

Figure 1:
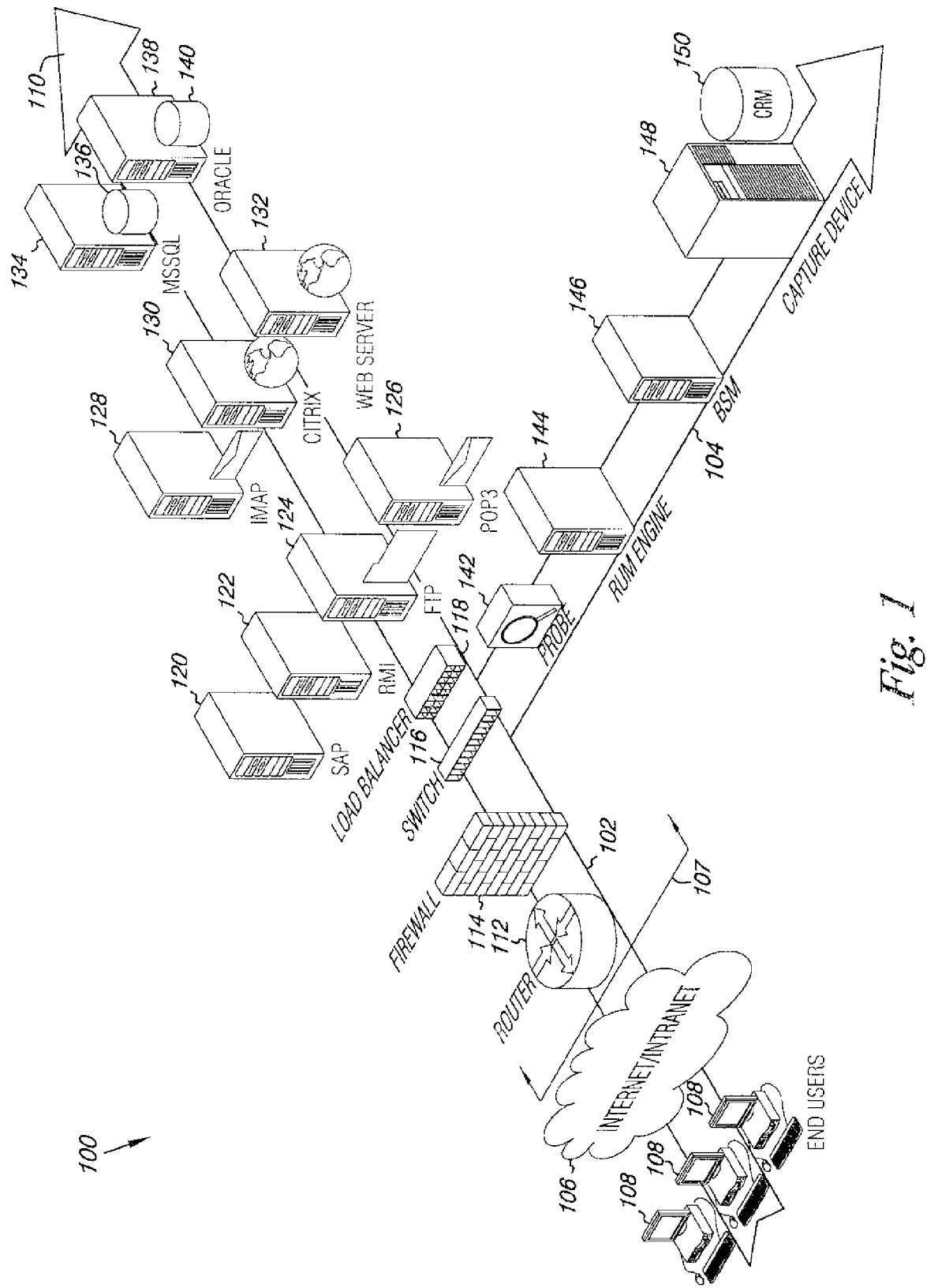
FIG. 1 illustrates a block diagram of an example of a computing system having network traffic according to the present disclosure.

FIG. 1 illustrates a block diagram of an example of a computing system having network traffic according to the present disclosure. The system can include a network 105 communicatively coupling a number of end users 108 to the computing devices of a business entity that, for example, may be used in implementing a business process. Boundary 107 indicates on FIG. 1 the demarcation of computing devices communicatively coupled to the network 106 that may be associated with the business entity. The network 106 can include a number of local area networks (LANs), a public network (e.g., the Internet), and/or a number of private networks (e.g., an intranet).

The computing devices of the business entity can establish a communication link 102 to the network and/or be communicatively coupled to one another via the communication link 102. For example, the communication link 102 may comprise a router 112 communicatively coupled to the network 106, a firewall 114 communicatively coupled to the router 112, and a switch 116 communicatively coupled to the firewall 114.

A main communication path 110 from the switch 116 by which a business process may be implemented may include a load balancer 118 communicatively coupled to the switch 115, and a number of application servers (e.g., SAP server 120, RMI server 122, FTP server 124, POP3 e-mail server 126, IMAP server 128, Citrix server 130, web server 132, MSSQL server 134 and associated MSSQL database 136, and an Oracle server 138 and associated Oracle database 140, among others) communicatively coupled to the load balancer 118 and/or communication path 110. Each of the number of application servers can include a number of applications running thereon. Such applications can include applications such as website hosting, inventory management, email management, Internet connectivity, file management, and databases, among others.

The application servers can be a machine such as a computing device. A computing device can include hardwired logic (e.g., control circuitry) such as a processor, a state machine, application specific integrated circuit (ASIC), controller, and/or similar machine.

The computing devices of the business entity can also include a network monitoring probe 142 to collect network traffic and/or data therefrom. For example, the network monitoring probe 142 can monitor a plurality of requests and responses sent via transmission control protocol/Internet protocol (TCP/IP) on the communication link 110 (e.g., as passes through the switch 116). The network monitoring probe 142 can monitor network traffic, for example, through switch 116 to extract a monitoring communication path 104. That is, the network monitoring probe 142 can be communicatively coupled to the switch 116. According to one or more examples, a network monitoring engine 144 (e.g., Real User Monitor (RUM) engine) can be communicatively coupled to the network monitoring probe 142, so as to receive the network traffic derived by the network monitoring probe 142. Network traffic can be collected with the network monitoring probe 142 directly from a network device (e.g., switch 116) and/or the network traffic can be mirrored to the network monitoring engine 144. The network monitoring engine 144 can be a network monitoring device and/or network monitoring application (e.g., a port sniffer) configured to mirror the network traffic, for example.

Examples of the present disclosure can include one network monitoring probe 142 or a plurality of network monitoring probes 142. The network monitoring engine 144 can assemble, filter, and/or sort network traffic from the one or more network monitoring probes 142. The network monitoring probe 142 and the network monitoring engine (e.g., computing device) and/or network monitoring application can be communicatively coupled in a wired or wireless manner. The network monitoring probe 142 and/or the network monitoring device can be a discrete computing device having processor and memory resources. The network monitoring application can be an application running on a separate computing device such as a server, router, switch, etc., or can be provided by another implementation.

In some examples, network traffic associated with one or more business applications of a business entity can be collected and provided to a business services management (BSM) computing device 146 for further analysis and/or manipulation. The BSM 146 can be communicatively coupled to the network monitoring engine 144. A capture device 148 can be communicatively coupled to the BSM computing device 146. The capture device 148 can have an internal or external computer readable medium 150 that is used by the capture device to store some or all of the network traffic derived by the network monitoring probe(s) 142.

As illustrated by the various computing resources described above in connection with FIG. 1, the reader can appreciate that an information technology (IT) environment may be a significant factor in the operational success of a business, particularly with respect to implementing business processes, which may be implemented using a number of applications executing on the number of application servers shown in FIG. 1, in an integrated fashion linked by communications over a network. As shown in part in FIG. 1, the IT environment may include computing networks with machines (e.g., electronic devices) such as routers, switches, hubs, servers, desktop PCs, laptops, workstations, and peripheral devices (e.g., printers, facsimile devices, and scanners, etc.) networked together. Such machines may include processor and memory resources and/or logic (e.g., embedded in an application specific integrated circuit (ASIC)).

The IT environment may be divided into domains such as mail, applications, databases, network, operating systems, files, internet and/or intranet, among others. Domain may include one or more servers to provide functionality for the domain, such as a mail server providing email functionality. Additionally, domains may include a domain manager to control and/or monitor certain aspects within the domain. Specific applications, such as customer relations management, inventory control, a retail website including dynamic marketing aspects, and enterprise accounting, among others, can support one or more business processes.

For example, a business process may involve selling products online. Operating an online store may not be able to process sales if the business's inventory system is not functioning and/or is functioning poorly. Specialization, narrow expertise, organizational boundaries, and/or fast-changing business objectives may contribute to increasing modularity of applications used to support a business process. Modularity may make the applications more inter-dependent. Customization may make the applications more unique, requiring correspondingly unique monitoring schemes. Today's business process can be diverse and complex, thus making them challenging to fully measure and/or manage.

Network traffic can also be monitored for other purposes, such as security. While FIG. 1 provides one possible arrangement and configuration of the computing devices associated with a business entity, embodiments of the present disclosure are not limited to any particular arrangement and/or configuration of computing devices. The arrangement and configuration of the computing devices shown in FIG. 1 are merely illustrative of general concepts.

Network traffic that is derived from the network monitoring probe 142, whether by mirroring or other methodology, can be referred to as being captured network traffic. Various tools (e.g., computing devices) exist to capture network traffic (e.g., TCP packets), process the captured network traffic (e.g., for business analysis, security analysis, or other use), and provide various reports based on the captured network traffic.

With the numerous computing devices and/or applications executing on various of the computing devices that may be employed by a business entity to implement, monitor, and manage a business process, the reader can appreciate a need for testing computing devices and/or applications prior to utilization in a live IT environment. For example, it can be beneficial to test a computing device and/or application that can include exposure to network traffic. Testing can occur in development of a product (e.g., computing device and/or application), for quality assurance purposes, and/or for performance testing.

One or more previous approaches to testing processes that involved network traffic (e.g., in a lab environment) included installing a server to serve request of a particular protocol (e.g., a Web server for HTTP) to generate network traffic to or through a computing device (e.g., server) and/or application being tested. For example, in testing a network monitoring engine 144, a test server is used to generate network traffic, which can be captured by a network monitoring probe 142 and forwarded to the network monitoring engine 144 for analysis. However, it can be difficult, perhaps expensive, and sometimes impossible, to have all versions of all servers installed in a lab, with all possible configurations that a product vendor might see in business entity's IT environments. That is, it can be challenging to create (e.g., generate) in a test environment, all particular circumstances of server equipment, protocol, and other factors that a computing device under test might experience in the field. This difficulty is not limited to business service management (BSM) products or instances, and can be applicable to other products and/or applications which have to analyze network traffic and parse different protocols, such as monitoring tools, intrusion detection systems (IDS), etc.

According to one or more embodiments of the present disclosure, instead of creating (e.g., generating) network traffic between a "real" client from a "real" source server, network traffic can be created for a test environment without having need for servers to dynamically be generating the load in real time. That is, according to the present disclosure, synthetic network traffic load is created based on one or more captured network traffic files. Network traffic can be captured (e.g., from a live IT environment) and replayed with certain modifications as described further below in the test environment. For example, a network traffic file can be captured with various tools from a business entity's live IT environment, such PCAP (packet capture) file, and stored (e.g., via capture device 148). PCAP network traffic capture files can be obtained from a readily available application programming interface (API) for capturing network traffic, such as tcpdump (e.g., an open source tool for capturing and dumping packets), Wireshark (e.g., a graphical packet capture and protocol analysis tool), or others.

A computing device and/or application vendor can ask a customer to record one or more applicable PCAP files from a live IT environment in which a product might be operated, and provide the PCAP files for use in development and/or troubleshooting test (e.g., lab) environments. Alternatively and/or additionally, network traffic created the test environment (e.g., lab) at one point in time can be recorded as one or a series of captured network traffic files for later use (e.g., when a "live" test system is no longer available). In this manner, computing devices can be tested using traffic derived from actual customer network traffic, thereby avoiding the complications and expense of having to create such network traffic originally in a test environment. For example, BSM equipment monitoring the replayed (optionally modified) captured network data will treat the test data as real data, thus better simulating a live IT environment in the lab.

Open source tools, such as "tcprewrite" can be used to modify captured data packets in a PCAP file, and "tcpreplay" can be used to send packets (original or modified) from a PCAP captured network traffic file to a network computing device. The "tcpreplay" tool can be used for replaying a PCAP captured network traffic file "as is" (e.g., without modification) to a network device, or replaying a PCAP captured network traffic file that has been previously manually modified (e.g., using the "tcprewrite" tool). However, unlike the methods of the present disclosure, using the "tcprewrite" and "tcpreplay" tools is a manual process to replay modified packet information, and thus does not support modification during replay.

According to an example of the present disclosure, synthetic network traffic load can be created for use in a test environment by modification of information in the data packets of a number of captured network traffic files. The information in the data packets can be modified in real time during replay. The captured network traffic flies can be run in replay for a scheduled time in order to generate a specified quantity of network traffic throughput on the system (e.g., network device) under test. According to the present disclosure, the information in the data packets can be modified during replay in such a manner to preserve the integrity of the original TCP/IP conversations (e.g., communications associated with a particular connection).

Figure 2:
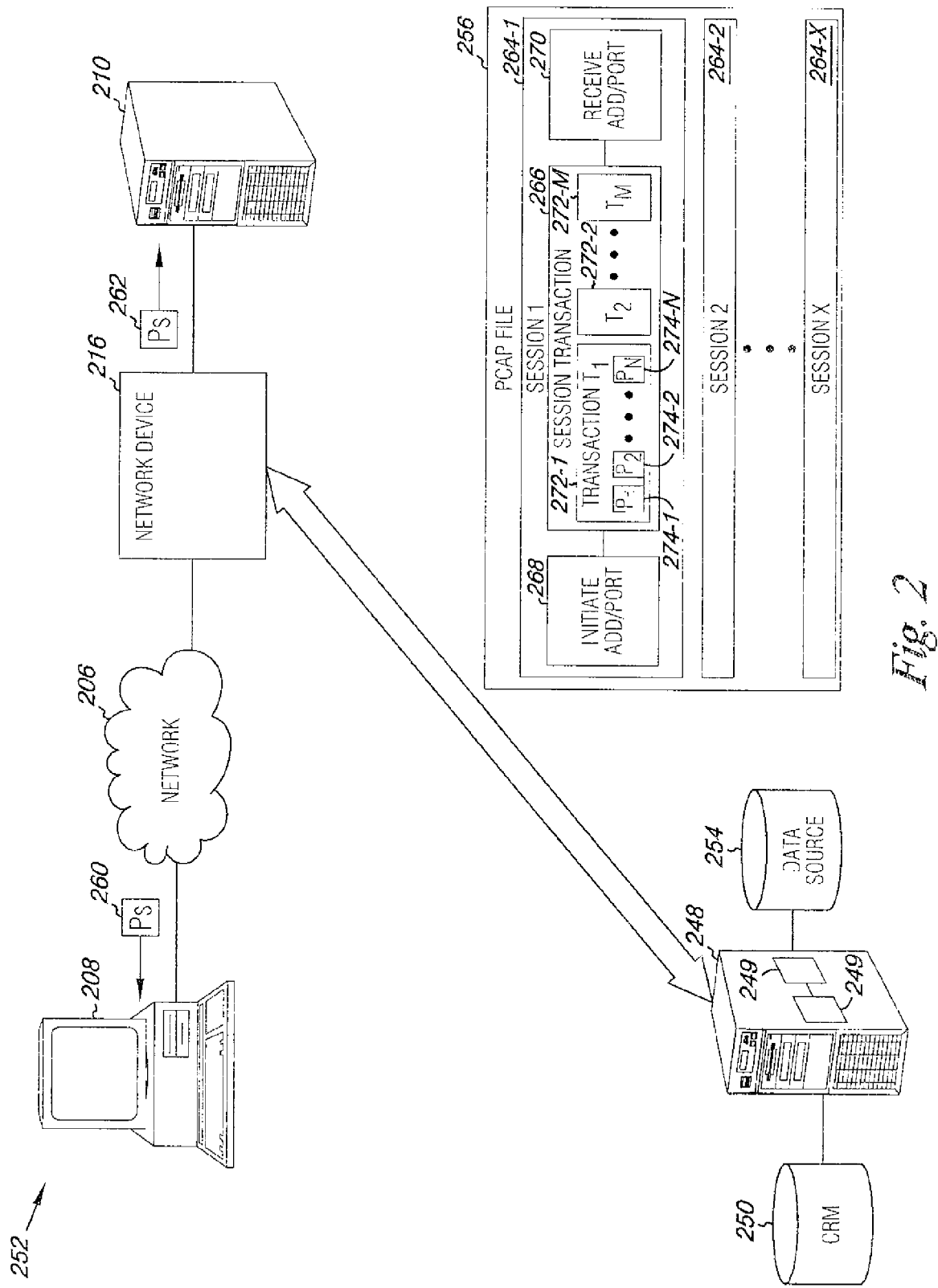
FIG. 2 illustrates a computing system for replaying captured network traffic according to the present disclosure.

FIG. 2 illustrates a computing system for replaying captured network traffic according to the present disclosure. FIG. 2 can be a simplified excerpt of portions of the computing system having network traffic illustrated in FIG. 1. According to an example embodiment, a computing system 252 for replaying captured network traffic can include a client computing device 208 (e.g., associated with an end user) communicatively coupled to a network 206. A server 210 is also communicatively coupled through a network device 216 (e.g., a switch) to the network 206. A capture/replay device 248 can also be communicatively coupled to the network device 216, the capture/repay device 248 having one or more processors 249 for executing instructions stored in an internal or external non-transitory computer readable medium 250. The capture/replay device 248 can also have a data source (e.g., non-transitory computer readable medium) having captured network traffic files (e.g., PCAP file) stored therein.

One example captured network traffic file 256 (e.g., PCAP file) that may be stored in the data source 254 is also illustrated in FIG. 2. The PCAP file can include a number of sessions (e.g., sessions 1, 2, . . . , X shown at 264-1, 264-2, . . . , 264-X). Each session includes a plurality of session transactions 266, as well as information defining an initiating IP address and port number of the session 268, and information defining a receiving IP address and port number of the session 270. The plurality of session transactions 266 includes a number of transactions (e.g., T1, T2, . . . , TN shown at 272-1, 272-2, . . . , 272-M), with each transaction comprising a quantity of packets (e.g., P1, P2, . . . , PN shown at 274-1, 274-2, . . . , 274-M). The capture device can communicate packets corresponding to a PCAP file session transaction to the network device, which then can be communicated to the client 208 (as indicated by session packet 260) or can be communicated to the server 210 (as indicated by session packet 262).

The reader will appreciate that in a test environment (e.g., in a lab), the network 206, client 208, and server 210 need not be duplicated where a network monitoring probe (e.g., FIG. 1 at 142; omitted for clarity from FIG. 2) is monitoring the network device 216 to provide network traffic to a BSM (e.g., FIG. 1 at 146; omitted for clarity from FIG. 2). That is, captured network traffic can be appropriately injected into network device 216 from capture/replay device 248 in order to simulate network traffic between server 210 and client 208 via network 206 without the server 210 and client 208 being physically connected to the network device 216. Thus, in the test environment (e.g., in a lab) the network device 216, and any network monitoring probe (e.g., FIG. 1 at 142; omitted for clarity from FIG. 2) monitoring the network device 216, do not "know" that a server 210 and client 208 are not physically connected to the network device 216, and that the network traffic communicated through the network device 216 is injected captured network traffic rather than network traffic generated in real time by a server 210 and client 208. In this way, a test environment can be created without having to actually install the server 210 and/or client 208, thereby saving effort, expense, equipment, and time.

According to one or more examples of the present disclosure, endpoint (e.g., initiating and/or receiving computing device address and/or port) modifications are made to PCAP file data during replay. When performing a series of tests, it can be desirable to control the IP addresses and ports of "clients" and "servers" so the computing device arrangement/configuration of a test environment can match (or approximate) the computing device arrangement/configuration of the live IT environment. For example, where an original PCAP file is captures from an IT environment that contains 20 connections from 4 different client IP addresses to 2 servers, but it is desired to change the PCAP file for use to simulate traffic from 2 clients to a single server, data (e.g., packets) of the original PCAP file can be modified during replay to meet the desired test arrangement.

According to an example of the present disclosure, packets of the original PCAP file are modified during replay (e.g., in real time) according to specified parameters. The specified input parameters can include one or more of the following: one or more original captured network traffic files (e.g., PCAP files) or identification thereof, an indication to modify the captured network traffic files and/or run as-is, an indication of a desired data rate and/or duration, an indication of the quantity of clients for the test environment, an indication of whether to confine client IP addresses to a specified range or assign random client IP addresses, an indication of whether or not to change the number of clients, an indication of the quantity of clients to include in the test environment with random client IP addresses, an indication of whether to confine client IP addresses to a specified range and input defining the client IP address range, an indication of whether or not to change the number of servers, an indication of the quantity of servers to include in the test environment with random client IP addresses, an indication of whether to confine server IP addresses to a specified range and input defining the server IP address range, a list of client and/or server endpoints (e.g., address and port), desired load rate, desired load duration, among others. According to at least one example, IP addresses can be specified for each of clients and/or servers of the test environment.

According to an example method of the present disclosure, the original PCAP file is examined to determine the original number of servers and clients. A mapping between the "original clients" and "new clients" (if any) is defined ensuring there are no collisions in connections' parameters. That is, for example, if in the original PCAP file there were connections from client (IP Address:port) 1.2.3.4:2000 to server port 10.10.10.10:80, and from client 1.2.3.5:2000 to the same server. Rewriting all the captured network traffic to a single (e.g., same) client having an IP address of 5.5.5.5 would also require changing all client ports in one of the connections to avoid all the traffic from appearing as originating from client 5.5.5.5:2000, which will lead to incorrect processing.

After determining a proper mapping for the new (e.g., test environment) arrangement and configuration, adjustments are made to preserve the consistency of the client's connections. For example, if any two connections had same client IP address in the original (e.g., captured) network traffic, the connections are assigned a same IP address in the new (e.g., modified) network traffic. Finally, all checksums (IP and TCP headers) are modified to correct values so as to correspond to new IP addresses and/or ports, if necessary.

According to one or more embodiments of the present disclosure, one or more captured network traffic files are replayed on a network device (e.g., a switch) substantially simultaneously (e.g., at least partially coincident in time with one another). During the replay zero or more of the following modifications are made to one or more individual data packets: chance the source IP address, change the source port, change the destination IP address, change the destination port, change the arrival time, correct the checksum to reflect other changes. The preceding changes can be made based on arbitrary TCP/IP endpoints substituted for zero or more of the original parameters (e.g., endpoint information).

Originally each captured network traffic file has the following properties: a list of one or more server endpoints (e.g., IP address and TCP port number), a list of one or more client endpoints, and a list of connections (e.g., conversations) between pairs of server and client endpoints. In preparation to replay more than one captured network traffic file at once (e.g., at least partially coincident in time with one another), such as in creating a single test case of network traffic, a common list of server endpoints is determined (e.g., to be used during replay across the more than one captured network traffic file), a common list of client endpoints is determined, and a common list of connections (e.g., conversations) is determined that preserves the integrity of the original conversations. That is, all packets belonging to a certain TCP connection of any of the original captured network traffic flies has to belong to a same new connection in the modified and replayed network traffic. To that end, the only packets in any new single connection are those packets of a single connection in an original captured network traffic file.

Inputs for replaying multiple captured network traffic files substantially simultaneously can include: a set (or identification thereof) of the plurality of original captured network traffic files, a list of target client endpoints, and a list of target server endpoints. According to one or more implementations, the lists of target client and/or server endpoints can be specified by a user or generated automatically based on predefined rules to result in the required number of unique IP addresses and port numbers (e.g., within a certain IP address range).

From the plurality of original captured network traffic files, and as the packets are being replayed (e.g., during replay), all unique TCP connections are identified. From the identified unique TCP connections, a list of original client and server endpoints are identified. New IP addresses are assigned to each original client and server endpoint for each original TCP connection, which may be the same as or different than the original endpoints for a particular connection. New server port numbers are assigned for each original TCP connection, which may be the same as or different than the original server port numbers for a particular connection. New client port numbers are assigned for each original TCP connection, which may be the same as or different than the original client port numbers for a particular connection. The assigned client port numbers can be predefined (e.g., specified as an input by a user), or randomly determined (e.g., within a specified range). The client port numbers are assigned such that each connection will have a unique tuple (e.g., unique combination of client IP address, client port number, server IP address, and server port number so as to avoid collisions). The IP and TCP checksums for each one of the packets are modified to correctly correspond to any new IP address and/or port number modifications made to the packet.

Additionally, timestamps associated with each packet can be shifted to: (1) preserve all time intervals between packets from a same captured network traffic file, or (2) shift in time packets from different captured network traffic files. Packets, and their associated transmission information, that are modified as described above are replayed on a network device.

While manual methods for "rewriting" of a value X in a given packet, to value Y, might be possible (e.g., with "tcprewrite"), the above-described methodology of automatically preserving the consistency of the original file for a new test environment configuration (e.g., spreading the captured network traffic among more or fewer servers and/or clients) is not dynamically implemented by such a tool. Furthermore, modifications using manual editing tools do not operate automatically in real time during replay (e.g., a separate activity). That is, other tools need to prepare (e.g., modify) a capture file in advance and then replay the modified file. According to the present disclosure, packets are modified as they are being replayed, dynamically changing packet information to apply predefined parameters for the replay.

According to an example method of the present disclosure, multiple captured network traffic files (e.g., PCAP files) are replayed simultaneously on the same network device. That is, multiple captured network traffic files (e.g., PCAP files) are modified (e.g., during the replay) as described herein to replay in a manner that mimics traffic between the same quantity, more, or fewer server and/or client computing devices, simultaneously on the same network device. When captured network traffic files (e.g., PCAP files) are replayed, consideration is given to possible "collisions" between the simultaneously-replayed PCAP files. For example, if a connection from client address/port 1.2.3.4:2000 appears in two different captured network traffic files, captured packets in at least one of them will have to be rewritten (e.g., to have a different client address/port combination) so that the replayed traffic does not include traffic from multiple connections involving a particular server or client address and port number (e.g., the captured network traffic from the two connections are not replayed as both involving the common server or client address/port. Thus, additional modifications to the packet information of zero or more connections in captured network traffic files may be accomplished to eliminate multiple connections in the replayed network traffic from having a same server and/or client address/port identification.

According to an example method of the present disclosure, replay of one or more (optionally modified) captured network traffic files (e.g., PCAP files) can be duplicated one or more times and replayed simultaneously to provide a specified traffic throughput (i.e., data rate). Furthermore, replay of one or more (optionally modified) captured network traffic files can be initiated at certain times in order to achieve a specified duration of the specified traffic throughput. Network traffic load (e.g., rate) can be adjusted (e.g., increased) by duplicating some or all of the connections captured in one or more network traffic files, and/or by reducing time intervals between packets (e.g., relative to the time interval between packets in the original captured network traffic file.

According to some embodiments, copies of original connections copy a connection as a whole, preserve integrity of a particular connection, and/or preserve uniqueness of a connection (e.g., avoid collisions caused by multiple connections having a same endpoint).

For example, assuming an original PCAP file was recorded during a time interval of 10 minutes, and has a size of 7.3 MB, thereby having an average throughput of the network traffic for this PCAP file of approximately 100 Kbps. To achieve a replay throughput rate of 10 Mbps, each connection can be "multiplied" (e.g., duplicated) about 100 times to be replayed substantially simultaneously. Additionally (or alternatively), the multiplied replay file could be initiated 6 times at 10 minute intervals to achieve the replay throughput rate of 10 Mbps for 1 hour. The initiate times of one or more of multiple connections and/or duplicate replays over time, can be staggered or simultaneously initiated. That is, the (optionally modified) captured network traffic file can be duplicated and replayed while another replay is ongoing (coincidentally) to increase throughput rate and/or replayed sequentially to increase throughput duration. The reader will appreciate that with a combination of coincident and sequential replays, a specified replay throughput rate and duration can be created by the methods of the present disclosure.

According to another example of the present disclosure, multiple captured PCAP can be played coincidentally and/or one after another to create network traffic loading of a specified throughput and duration. The present disclosure also contemplates a combination of duplication and/or repetition of one PCAP file and/or coincident and/or sequential replay of individual ones of multiple PCAP files to create a desired volume and duration of network traffic on a single network device.

As was described above with respect to possible collisions between two (or more) PCAP files, the reader will appreciate that collisions can occur between PCAP files that are duplicate of one another. Thus, similar collision avoidance modifications to data packet information (e.g., to prevent duplicate simultaneous connections involving a same server and/or client address and port) are accomplished to preserve the consistency of TCP connections. Furthermore according to the present disclosure, original intervals between packets in same connection are preserved, otherwise the duration of generated user sessions would be shorter than in real environment in which they were captured.

According to an example of the present disclosure start times of each replayed connection are scheduled that will provide a specified replayed network traffic throughput and/or duration.

Figure 3:
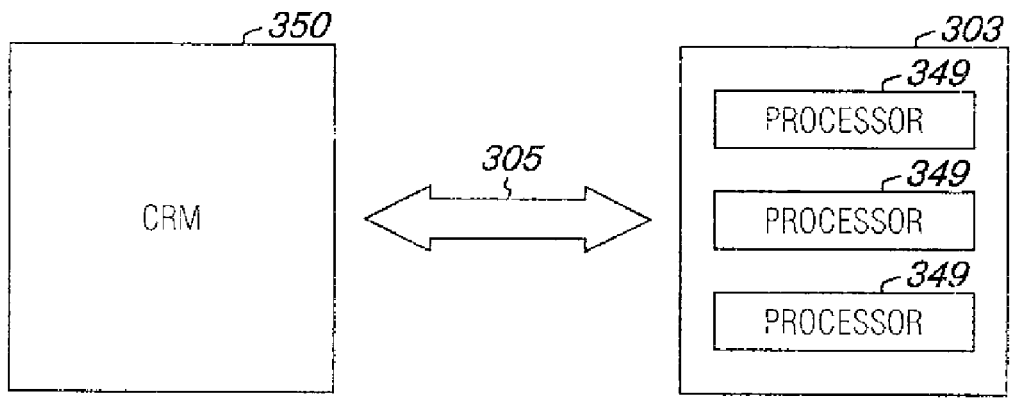
FIG. 3 illustrates a block diagram of an example of a computer readable medium (CRM) in communication with processing resources according to the present disclosure.

FIG. 3 illustrates a block diagram of an example of a computer readable medium (CRM) 350 in communication with processing resources 303 according to the present disclosure. As used herein, processor resources 303 can include one or a plurality of processors 349 such as in a parallel processing arrangement. A computing device having processor resources can be in communication with, and/or receive a tangible non-transitory computer readable medium (CRM) 350 storing a set of computer readable instructions (e.g., software) for capturing and/or replaying network traffic, as described herein.

As used herein, the indefinite articles "a" and/or "an" can indicate one or more than one of the named object. Thus, for example, "a processor" can include one processor or more than one processor. Processor resources can be also be control circuitry that can have a structure that provides a given functionality, and/or execute computer-readable instructions that are stored on an internal or external non-transitory computer-readable medium.

Non-transitory computer-readable medium (e.g., computer readable medium 350), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital video discs (DVD), high definition digital versatile discs (HD DVD), compact discs (CD), and/or a solid state drive (SSD), flash memory, etc., as well as other types of machine-readable media.

The non-transitory computer-readable medium can be integral, or communicatively coupled, to a computing device, in either in a wired or wireless manner. For example, the non-transitory computer-readable medium can be an internal memory, a portable memory, a portable disk, or a memory located internal to another computing resource (e.g., enabling the computer-readable instructions to be downloaded over the Internet). The non-transitory computer-readable medium can have computer-readable instructions stored thereon that are executed by the processing resources (e.g., control circuitry, processor(s)) to provide a particular functionality.

The CRM 350 can be in communication with the processor 303 resources via a communication path 305. The communication path 305 can be local or remote to a machine associated with the processor resources 303. Examples of a local communication path 305 can include an electronic bus internal to a machine such as a computer where the CRM 350 is one of volatile, non-volatile, fixed, and/or removable storage medium in communication with the processor resources 303 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

In other examples, the communication path 305 can be such that the CRM 350 is remote from the processor resources 303 such as in the example of a network connection between the CRM 350 and the processor resources 303 (e.g., the communication path 305 can be a network connection). Examples of such a network connection can include a local area network (LAN), a wide area network (WAN), a personal area network (PAN), the Internet, among others. In such examples, the CRM 350 may be associated with a first computing device (e.g., a server) and the processor resources 303 may be associated with a second computing device (e.g., a client). The first and second computers can be in communication via a networked communication path 305.

Logic can be used to implement the method(s) of the present disclosure, in whole or part. Logic can be implemented using appropriately configured hardware and/or software. For example the capture/replay device 248 shown in FIG. 2 can include logic configured to identify all unique original TCP connections in the captured network traffic files, logic configured to identify unique client/server endpoints of the unique TCP connections, logic configured to assign new IP addresses to each of the unique client/server endpoints, logic configured to assign a new port number to particular client/server endpoints such that each of the unique original TCP connections has a new client/server endpoint with a unique combination of client IP address, client port, server IP address, and server port, logic configured to modify IP and TCP checksums for each data packet of the captured network traffic files to correctly reflect the new client/server endpoints, and logic configured to replay each data packet of the captured network traffic files to the network device. The above-mention logic portions may be discretely implemented and/or implemented in a common arrangement. Furthermore, the above-mention logic portions may be included in one or more computing devices communicatively coupled to the network device, which are arranged as a system to provide network traffic to the network device.

Figure 4:
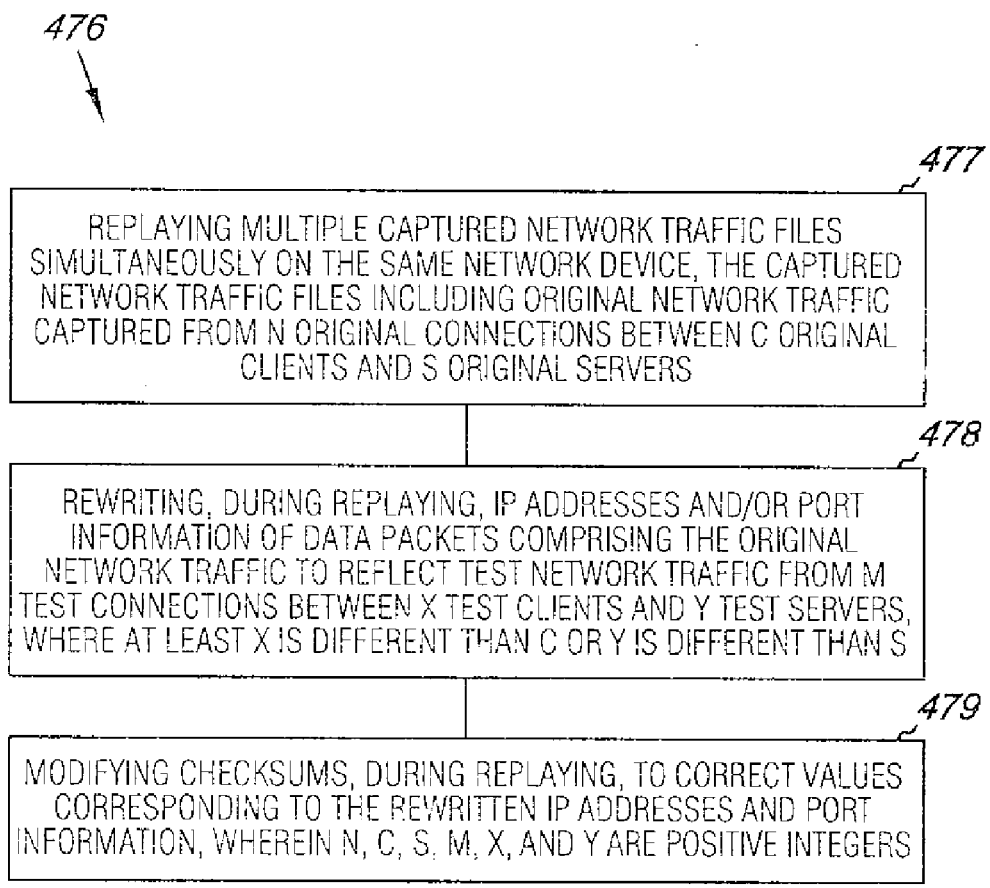
FIG. 4 is a flow chart illustrating an example of a method for replaying captured network traffic according to the present disclosure.

FIG. 4 is a flow chart illustrating an example of a method for replaying captured network traffic 475 according to the present disclosure. The method for replaying captured network traffic 476 includes replaying 477 multiple captured network traffic files simultaneously on the same network device, the captured network traffic files including original network traffic captured from N original connections between C original clients and S original servers. During replaying, rewriting 478 IP addresses and/or port number information of data packets comprising the original network traffic to reflect test network traffic from M test connections between X test clients and Y test servers, where at least X is different than C or Y is different than S. The method further includes modifying 479 checksums, during replaying, to correct values corresponding to the rewritten IP addresses and port number information. N, C, S, M, X, and Y are positive integers.

Figure 5:
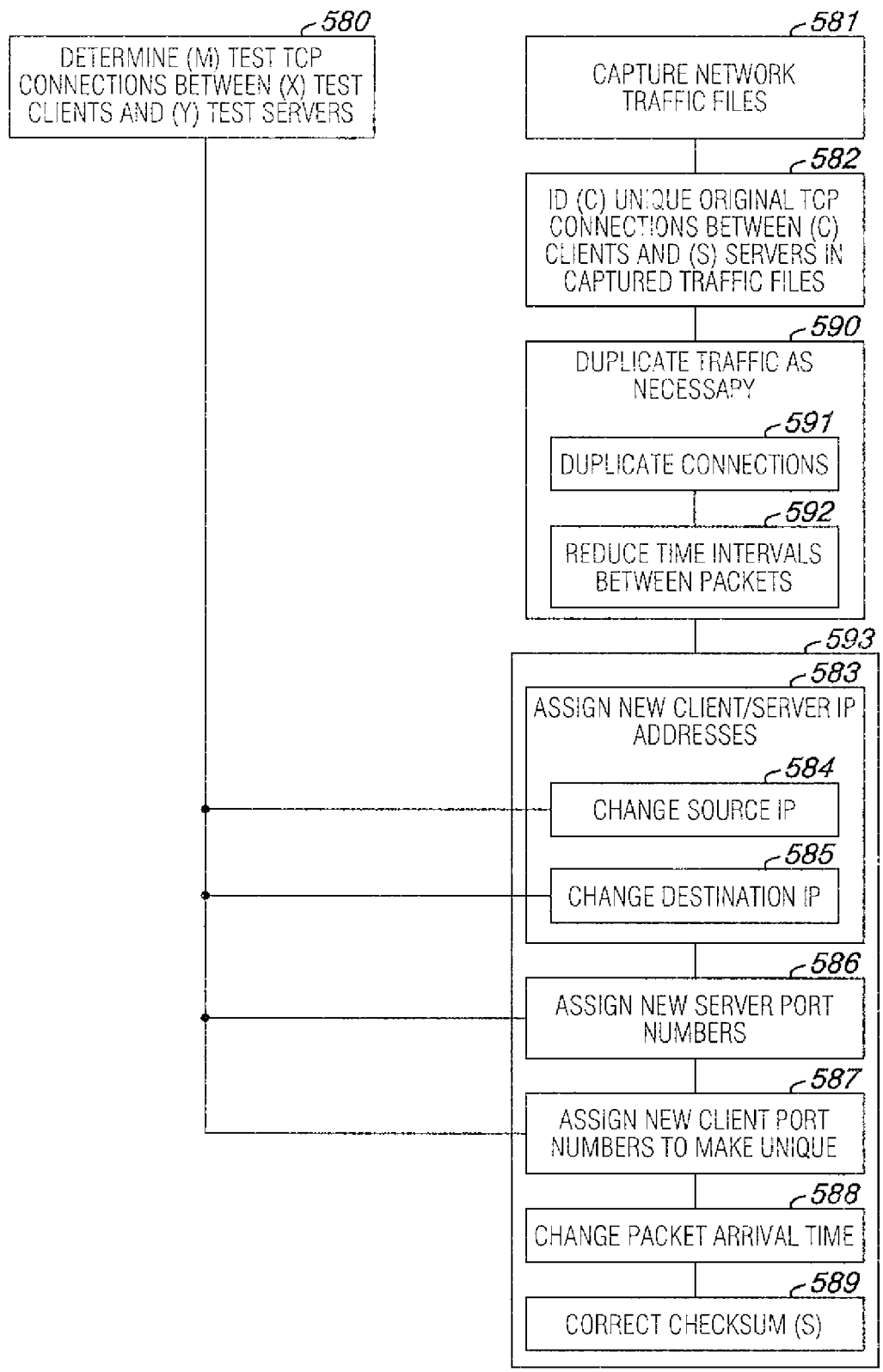
FIG. 5 is a flow diagram illustrating an example of a method for replaying captured network traffic according to the present disclosure.

FIG. 5 is a flow diagram illustrating an example of a method for replaying captured network traffic according to the present disclosure. As illustrated at 580, a test traffic environment can be designed, including determining a quantity (M) of test connections (e.g., the "new" connections between a quantity (X) of test clients and (Y) test servers. As illustrated at 581, live network data can be collected, for example with or without instrumenting applications running on the network. Examples of such collection can include collecting network traffic by monitoring TCP/IP requests and responses with the network monitoring probe, and/or mirroring network traffic to the network monitoring engine, as was previously described with respect to FIG. 1.

The quantity (N) of unique original TCP connections between (C) original clients and (S) original servers is identified in the captured traffic file(s), as illustrated at 582. The term "original" is used herein in association with the nomenclature of the servers and clients from which network traffic is captured, and "test" or "new" is used in association with the nomenclature for the new server and client identities of the network traffic to be used for testing.

As illustrated at 590, the captured network traffic files can be duplicated, as necessary, to modify the volume of network traffic provided for testing purposes. Duplication can be accomplished, for example, by duplicating captured connections, along with the traffic therebetween to increase network traffic volume, as shown at 592. Additionally or alternatively, duplication can be accomplished, for example, by reducing time intervals between packets, as shown at 592.

Captured network traffic files are replayed, as indicated at 593, which can include duplicated network traffic files, as necessary to provide the desired replay network traffic volume. During replay, the captured network traffic files can be modified (e.g., the information contained in respective data packets) to reflect the implemented test client/server configuration. As illustrated at 583, new client and server IP addresses are assigned (e.g., corresponding to the (M) test TCP connections between (X) test clients and (Y) test servers determined at 580. Assigning new IP addresses can include, for each data packet, changing the source device IP address as shown at 584 and changing the destination device IP address as shown at 585

As shown at 586, new server port numbers can be assigned, and new client port numbers can be assigned as illustrated at 587, such that each original connection will end up with a unique tuple of client IP, client port, server IP, and server port. For example, a predefined and/or random client port number can be assigned to respective connections.

Further, the data packet timestamp (e.g., arrive time) can be changed, as indicated at 588, to reflect appropriate packet timing. For example, where certain network traffic capture files are shifted in time and/or where intervals between packets in a same capture fife are modified to change packet flow rate. Finally, checksum(s), such as IP and TCP checksums can be corrected for each packet to reflect the modified IP/port values, as illustrated at 589.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

Various examples of the system and method for collaborative information services have been described in detail with reference to the drawings, where like reference numerals represent like parts and assemblies throughout the several views. Reference to various examples does not limit the scope of the system and method for displaying advertisements, which is limited just by the scope of the claims attached hereto. Additionally, any examples set forth in this specification are not intended to be limiting and merely set forth some of the many possible examples for the claimed system and method for collaborative information services.

Throughout the specification and claims, the meanings identified below do not necessarily limit the terms, but merely provide illustrative examples for the terms. The meaning of "a," "an," and "the" includes plural reference, and the meaning of "in" includes "in" and "on." The phrase "in an embodiment" as used herein does not necessarily refer to the same embodiment, although it may.

In the foregoing discussion of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure. As used herein, the designators "N," "M," and "X" particularly with respect to reference numerals in the drawings, indicate that a number of the particular feature so designated can be included with examples of the present disclosure. The designators can represent the same or different numbers of the particular features.

The figures attempt to follow a numbering convention in which the first digit or digits correspond to the drawing figure number and the remaining digits identify an element or component in the drawing. Similar elements or components between different figures may be identified by the use of similar digits. For example, 116 may reference element "16" in FIG. 1, and a similar element may be referenced as 216 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

In Detailed Description, some features are grouped together in a single embodiment for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for replaying captured network traffic, comprising:
   replaying multiple captured network traffic files simultaneously on the same network device, the captured network traffic files including original network traffic captured from N original connections between C original clients and S original servers;
   rewriting, during replaying, IP addresses and/or port number information of data packets comprising the original network traffic to reflect test network traffic from M test connections between X test clients and Y test servers, where at least X is different than C or Y is different than S;
   modifying checksums, during replaying, to correct values corresponding to the rewritten IP addresses and port number information; and
   wherein N, C, S, M, X, and Y are positive integers.

2. The method of claim 1, wherein rewriting includes:
   defining the mapping between the C clients and the X clients; and
   changing all client port number information in at least one test connection involving a particular one of the X test clients where multiple original clients are mapped to the particular one of the X test clients.

3. The method of claim 1, wherein rewriting includes preserving consistency between the N original connections and the M test connections such that any two original connections of a same captured network traffic file having a same original client IP address have a same test client IP address.

4. The method of claim 1, wherein rewriting includes preventing possible network traffic collisions where an original connection from an original client exists in more than one captured network traffic file by changing the IP addresses and/or port number information of network traffic corresponding the original connection in at least all but one captured network traffic file.

5. The method of claim 1, wherein replaying multiple captured network traffic files simultaneously on the same network device includes multiplying a number of N original connections to provide the M test connections, M being larger than N.

6. The method of claim 5, further comprising scheduling a replay start time for each of the M test connections, wherein replaying includes starting replay of a particular test connection at the associated scheduled start time.

7. The method of claim 6, wherein M and the replay start time for each of the M test connections is selected to provide a defined average throughput network traffic rate for a defined duration.

8. The method of claim 1, wherein rewriting includes modifying a number of data packets to: change a source IP address, change a source port number information, change a destination IP address, and/or change a destination port number information.

9. The method of claim 1, wherein rewriting includes modifying a number of data packets to change arrival time.

10. The method of claim 1, wherein modifying checksums includes modifying all IP address and TCP header checksums.

11. A non-transitory computer-readable medium having computer-readable instructions stored thereon that, if executed by one or more processors, cause the one or more processors to:
   identify all unique original TCP connections in all input captured network traffic files;
   identify unique client endpoints and server endpoints of the unique TCP connections;
   assign new IP addresses to each of the unique client endpoints and server endpoints;
   assign a new server port number and a new client port number for each of the unique original TCP connections, wherein each of the unique original TCP connections has a new client endpoint and server endpoint with a unique combination of client IP address, client port, server IP address, and server port;
   modify IP and TCP checksums for each data packet of the input captured network traffic files to correctly reflect the new client and server endpoints; and
   replay each data packet of the input captured network traffic files on a same network device.

12. The non-transitory machine-readable medium of claim 11, including machine-readable instructions stored thereon that are executed by a processor to shift timestamps of each data packet to preserve all time intervals between data packets in same captured network traffic files.

13. The non-transitory machine-readable medium of claim 12, including machine-readable instructions stored thereon that are executed by a processor to shift timestamps of each data packet to differently shift in time data packets in different captured network traffic files.

14. The non-transitory machine-readable medium of claim 11, including machine-readable instructions stored thereon that are executed by a processor to replay all data packets on a single network device in a manner to maintain an original time interval between data packets of a same connection.

15. A captured network traffic replay system, comprising:
   a network device;

one or more computing devices communicatively coupled to the network device and arranged to provide network traffic to the network device, the one or more computing devices including:

logic configured to identify all unique original TCP connections in the captured network traffic files;

logic configured to identify unique client/server endpoints of the unique TCP connections;

logic configured to assign new IP addresses to each of the unique client/server endpoints;

logic configured to assign a new port number to particular client/server endpoints such that each of the unique original TCP connections has a new client/server endpoint with a unique combination of client IP address, client port, server IP address, and server port;

logic configured to modify IP and TCP checksums for each data packet of the captured network traffic files to correctly reflect the new client/server endpoints; and logic configured to replay each data packet of the captured network traffic files to the network device.

* * * * *